(12) United States Patent
Taylor et al.

(10) Patent No.: US 7,890,618 B2
(45) Date of Patent: *Feb. 15, 2011

(54) METHOD AND SYSTEM FOR PROVISIONING AND MAINTAINING A CIRCUIT IN A DATA NETWORK

(75) Inventors: William S. Taylor, Duluth, GA (US); Thad June, Stone Mountain, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/339,426

(22) Filed: Dec. 19, 2008

(65) Prior Publication Data

US 2009/0103544 A1    Apr. 23, 2009

Related U.S. Application Data

(63) Continuation of application No. 10/348,592, filed on Jan. 21, 2003, now Pat. No. 7,469,282.

(51) Int. Cl.
*G06F 15/173* (2006.01)

(52) U.S. Cl. .................. 709/223; 709/224; 370/216; 370/242; 370/252; 714/4

(58) Field of Classification Search .............. 709/223, 709/224; 370/216; 714/4
See application file for complete search history.

(56) References Cited

U.S. PATENT DOCUMENTS

| | | |
|---|---|---|
| 4,905,233 A | 2/1990 | Cain et al. |
| 5,016,244 A | 5/1991 | Massey, Jr. et al. |
| 5,065,392 A | 11/1991 | Sibbitt et al. |

(Continued)

OTHER PUBLICATIONS

United States Patent and Trademark Office, "Non-Final Office Action," issued in connection with U.S. Appl. No. 10/348,077, on Jan. 4, 2007 (15 pages).

(Continued)

*Primary Examiner*—Salad Abdullahi
(74) *Attorney, Agent, or Firm*—Hanley, Flight and Zimmerman, LLC (57) ABSTRACT

A method and system are provided for provisioning a circuit in a data network without manual intervention. A network management module receives an order for provisioning the circuit and then, based on the order, transmits a request to a legacy logical element module to configure a logical circuit in one or more network devices in the network. The network device may be a switch. The circuit may be a frame relay circuit or an ATM circuit. A method and system are also provided for maintaining a network circuit in a data network. The network circuit includes both a logical circuit and a physical circuit. A legacy physical element module sends a request for logical circuit data to a legacy logical element module through a network management module in communication with the legacy physical element module and the legacy physical element module. Based on the request, the legacy logical element module retrieves the logical circuit data from one or more network devices in the network and transmits the data to the legacy physical element module through the network management module. Upon receiving the logical circuit data, the legacy physical element module troubleshoots the physical circuit to maintain the network circuit.

25 Claims, 3 Drawing Sheets

U.S. PATENT DOCUMENTS

| | | |
|---|---|---|
| 5,241,534 A | 8/1993 | Omuro et al. |
| 5,265,092 A | 11/1993 | Soloway et al. |
| 5,375,126 A | 12/1994 | Wallace |
| 5,408,461 A | 4/1995 | Uriu et al. |
| 5,539,817 A | 7/1996 | Wilkes |
| 5,544,170 A | 8/1996 | Kasahara |
| 5,548,639 A | 8/1996 | Ogura et al. |
| 5,559,959 A | 9/1996 | Foglar |
| 5,629,938 A | 5/1997 | Cerciello et al. |
| 5,633,859 A | 5/1997 | Jain et al. |
| 5,650,994 A | 7/1997 | Daley |
| 5,764,626 A | 6/1998 | VanDervort |
| 5,774,456 A | 6/1998 | Ellebracht et al. |
| 5,812,528 A | 9/1998 | VanDervort |
| 5,832,197 A | 11/1998 | Houji |
| 5,848,055 A | 12/1998 | Fedyk et al. |
| 5,856,981 A | 1/1999 | Voelker |
| 5,894,475 A | 4/1999 | Bruno et al. |
| 5,926,456 A | 7/1999 | Takano et al. |
| 5,936,939 A | 8/1999 | Des Jardins et al. |
| 6,028,863 A | 2/2000 | Sasagawa et al. |
| 6,038,219 A | 3/2000 | Mawhinney et al. |
| 6,091,951 A | 7/2000 | Sturniolo et al. |
| 6,104,998 A | 8/2000 | Galand et al. |
| 6,108,300 A | 8/2000 | Coile et al. |
| 6,108,307 A | 8/2000 | McConnell et al. |
| 6,118,763 A | 9/2000 | Trumbull |
| 6,147,998 A | 11/2000 | Kelley et al. |
| 6,167,025 A | 12/2000 | Hsing et al. |
| 6,181,675 B1 | 1/2001 | Miyamoto |
| 6,181,679 B1 * | 1/2001 | Ashton et al. ............... 370/244 |
| 6,185,695 B1 | 2/2001 | Murphy et al. |
| 6,195,416 B1 | 2/2001 | DeCaluwe et al. |
| 6,259,696 B1 | 7/2001 | Yazaki et al. |
| 6,269,401 B1 | 7/2001 | Fletcher et al. |
| 6,311,288 B1 | 10/2001 | Heeren et al. |
| 6,360,260 B1 | 3/2002 | Compliment et al. |
| 6,366,581 B1 | 4/2002 | Jepsen |
| 6,377,548 B1 | 4/2002 | Chuah |
| 6,421,722 B1 | 7/2002 | Bauer et al. |
| 6,424,629 B1 | 7/2002 | Rubino et al. |
| 6,449,259 B1 | 9/2002 | Allain et al. |
| 6,456,306 B1 | 9/2002 | Chin et al. |
| 6,473,398 B1 | 10/2002 | Wall et al. |
| 6,535,990 B1 | 3/2003 | Iterum et al. |
| 6,538,987 B1 | 3/2003 | Cedrone et al. |
| 6,549,533 B1 | 4/2003 | Campbell |
| 6,553,015 B1 | 4/2003 | Sato |
| 6,556,659 B1 | 4/2003 | Bowman-Amuah |
| 6,570,846 B1 | 5/2003 | Ryoo |
| 6,581,166 B1 | 6/2003 | Hirst et al. |
| 6,590,899 B1 | 7/2003 | Thomas et al. |
| 6,594,246 B1 | 7/2003 | Jorgensen |
| 6,594,268 B1 | 7/2003 | Aukia et al. |
| 6,597,689 B1 | 7/2003 | Chiu et al. |
| 6,608,831 B1 | 8/2003 | Beckstrom et al. |
| 6,625,114 B1 | 9/2003 | Hassell |
| 6,643,254 B1 | 11/2003 | Kajitani et al. |
| 6,687,228 B1 | 2/2004 | Fichou et al. |
| 6,697,329 B1 | 2/2004 | McAllister et al. |
| 6,711,125 B1 | 3/2004 | Walrand et al. |
| 6,716,165 B1 | 4/2004 | Flanders et al. |
| 6,738,459 B1 * | 5/2004 | Johnstone et al. ...... 379/114.01 |
| 6,763,476 B1 | 7/2004 | Dangi et al. |
| 6,766,113 B1 | 7/2004 | Al-Salameh et al. |
| 6,781,952 B2 | 8/2004 | Shirakawa |
| 6,795,393 B1 | 9/2004 | Mazzurco et al. |
| 6,795,394 B1 | 9/2004 | Swinkels et al. |
| 6,810,043 B1 | 10/2004 | Naven et al. |
| 6,823,477 B1 | 11/2004 | Cheng et al. |
| 6,826,184 B1 | 11/2004 | Bryenton et al. |
| 6,829,223 B1 | 12/2004 | Richardson et al. |
| 6,842,513 B1 | 1/2005 | Androski et al. |
| 6,862,351 B2 | 3/2005 | Taylor |
| 6,865,170 B1 | 3/2005 | Zendle |
| 6,882,652 B1 | 4/2005 | Scholtens et al. |
| 6,885,678 B2 | 4/2005 | Curry et al. |
| 6,925,578 B2 | 8/2005 | Lam et al. |
| 6,952,395 B1 | 10/2005 | Manoharan et al. |
| 6,973,034 B1 | 12/2005 | Natarajan et al. |
| 6,973,037 B1 | 12/2005 | Kahveci |
| 6,978,394 B1 | 12/2005 | Charny et al. |
| 6,981,039 B2 | 12/2005 | Cerami et al. |
| 6,983,401 B2 | 1/2006 | Taylor |
| 6,990,616 B1 | 1/2006 | Botton-Dascal et al. |
| 7,012,898 B1 | 3/2006 | Farris et al. |
| 7,027,053 B2 | 4/2006 | Berndt et al. |
| 7,035,202 B2 | 4/2006 | Callon |
| 7,043,250 B1 | 5/2006 | DeMartino |
| 7,072,331 B2 | 7/2006 | Liu et al. |
| 7,093,155 B2 | 8/2006 | Aoki |
| 7,120,148 B1 | 10/2006 | Batz et al. |
| 7,120,819 B1 | 10/2006 | Gurer et al. |
| 7,146,000 B2 | 12/2006 | Hollman et al. |
| 7,165,192 B1 | 1/2007 | Cadieux et al. |
| 7,184,439 B1 | 2/2007 | Aubuchon et al. |
| 7,200,148 B1 | 4/2007 | Taylor et al. |
| 7,209,452 B2 | 4/2007 | Taylor et al. |
| 7,240,364 B1 | 7/2007 | Branscomb et al. |
| 7,275,192 B2 | 9/2007 | Taylor et al. |
| 7,287,083 B1 | 10/2007 | Nay et al. |
| 7,350,099 B2 | 3/2008 | Taylor et al. |
| 7,391,734 B2 | 6/2008 | Taylor et al. |
| 7,460,468 B2 | 12/2008 | Taylor et al. |
| 7,466,646 B2 | 12/2008 | Taylor et al. |
| 7,469,282 B2 | 12/2008 | Taylor et al. |
| 7,609,623 B2 | 10/2009 | Taylor et al. |
| 7,630,302 B2 | 12/2009 | Taylor et al. |
| 7,639,606 B2 | 12/2009 | Taylor et al. |
| 7,639,623 B2 | 12/2009 | Taylor et al. |
| 7,646,707 B2 | 1/2010 | Taylor et al. |
| 7,768,904 B2 | 8/2010 | Taylor et al. |
| 2001/0000700 A1 | 5/2001 | Eslambolchi et al. |
| 2002/0001307 A1 | 1/2002 | Nguyen et al. |
| 2002/0072358 A1 | 6/2002 | Schneider et al. |
| 2002/0089985 A1 | 7/2002 | Wahl et al. |
| 2002/0112072 A1 | 8/2002 | Jain |
| 2002/0172148 A1 | 11/2002 | Kim et al. |
| 2002/0181402 A1 | 12/2002 | Lemoff et al. |
| 2003/0043753 A1 | 3/2003 | Nelson et al. |
| 2003/0051049 A1 * | 3/2003 | Noy et al. ................... 709/238 |
| 2003/0051195 A1 | 3/2003 | Bosa et al. |
| 2003/0086413 A1 | 5/2003 | Tartarelli et al. |
| 2003/0091024 A1 | 5/2003 | Stumer |
| 2003/0092390 A1 | 5/2003 | Haumont |
| 2003/0117951 A1 | 6/2003 | Wiebe et al. |
| 2003/0128692 A1 | 7/2003 | Mitsumori et al. |
| 2003/0152028 A1 | 8/2003 | Raisanen et al. |
| 2003/0185151 A1 | 10/2003 | Kurosawa et al. |
| 2004/0090918 A1 | 5/2004 | McLendon |
| 2004/0090973 A1 | 5/2004 | Christie et al. |
| 2004/0125776 A1 | 7/2004 | Haugli et al. |
| 2004/0141464 A1 | 7/2004 | Taylor et al. |
| 2004/0172574 A1 | 9/2004 | Wing et al. |
| 2005/0002339 A1 | 1/2005 | Patil et al. |
| 2005/0013242 A1 | 1/2005 | Chen et al. |
| 2005/0135237 A1 | 6/2005 | Taylor et al. |
| 2005/0135238 A1 | 6/2005 | Taylor et al. |
| 2005/0135254 A1 | 6/2005 | Taylor et al. |
| 2005/0135263 A1 | 6/2005 | Taylor et al. |
| 2005/0138203 A1 | 6/2005 | Taylor et al. |
| 2005/0138476 A1 | 6/2005 | Taylor et al. |
| 2005/0152028 A1 | 7/2005 | Mitzkus |
| 2005/0172160 A1 | 8/2005 | Taylor et al. |

| | | |
|---|---|---|
| 2005/0172174 A1 | 8/2005 | Taylor et al. |
| 2005/0237925 A1 | 10/2005 | Taylor et al. |
| 2005/0238006 A1 | 10/2005 | Taylor et al. |
| 2005/0238007 A1 | 10/2005 | Taylor et al. |
| 2005/0238024 A1 | 10/2005 | Taylor et al. |
| 2005/0240840 A1 | 10/2005 | Taylor et al. |
| 2005/0276216 A1 | 12/2005 | Vasseur et al. |
| 2006/0013210 A1 | 1/2006 | Bordogna et al. |
| 2006/0146700 A1 | 7/2006 | Taylor et al. |
| 2006/0153066 A1 | 7/2006 | Saleh et al. |
| 2007/0050492 A1 | 3/2007 | Jorgensen |
| 2007/0168200 A1 | 7/2007 | Shimizu |
| 2009/0041012 A1 | 2/2009 | Taylor et al. |
| 2009/0086626 A1 | 4/2009 | Taylor et al. |
| 2009/0103544 A1 | 4/2009 | Taylor et al. |
| 2009/0323534 A1 | 12/2009 | Taylor et al. |
| 2010/0020677 A1 | 1/2010 | Taylor et al. |
| 2010/0046366 A1 | 2/2010 | Taylor et al. |
| 2010/0046380 A1 | 2/2010 | Taylor et al. |
| 2010/0054122 A1 | 3/2010 | Taylor et al. |

OTHER PUBLICATIONS

United States Patent and Trademark Office, "Interview Summary," issued in connection with U.S. Appl. No. 10/348,077, on May 11, 2007 (2 pages).
United States Patent and Trademark Office, "Final Office Action," issued in connection with U.S. Appl. No. 10/348,077, on Aug. 10, 2007 (26 pages).
United States Patent and Trademark Office, "Notice of Allowance," issued in connection with U.S. Appl. No. 10/348,077, on Apr. 29, 2008 (10 pages).
United States Patent and Trademark Office, "Notice of Allowance," issued in connection with U.S. Appl. No. 10/348,592, on Oct. 14, 2008 (4 pages).
United States Patent and Trademark Office, "Final Office Action," issued in connection with U.S. Appl. No. 10/348,592, on Mar. 21, 2008 (11 pages).
United States Patent and Trademark Office, "Non-Final Office Action," issued in connection with U.S. Appl. No. 10/348,592, on Jun. 14, 2007 (10 pages).
United States Patent and Trademark Office, "Non-Final Office Action," issued in connection with U.S. Appl. No. 10/348,592, on Sep. 8, 2006 (7 pages).
United States Patent and Trademark Office, "Notice of Allowance," issued in connection with U.S. Appl. No. 10/744,281, on Oct. 30, 2007 (8 pages).
United States Patent and Trademark Office, "Notice of Allowance," issued in connection with U.S. Appl. No. 10/744,281, on Aug. 27, 2007 (6 pages).
United States Patent and Trademark Office, "Interview Summary," issued in connection with U.S. Appl. No. 10/744,281, on Aug. 6, 2007 (3 pages).
United States Patent and Trademark Office, "Final Office Action," issued in connection with U.S. Appl. No. 10/744,281, on Apr. 17, 2007 (18 pages).
United States Patent and Trademark Office, "Interview Summary," issued in connection with U.S. Appl. No. 10/744,281, on Nov. 27, 2006 (3 pages).
United States Patent and Trademark Office, "Non-Final Office Action," issued in connection with U.S. Appl. No. 10/744,281, on Oct. 2, 2006 (16 pages).
United States Patent and Trademark Office, "Notice of Allowance," issued in connection with U.S. Appl. No. 10/744,283, on Sep. 18, 2009 (11 pages).
United States Patent and Trademark Office, "Non-Final Office Action," issued in connection with U.S. Appl. No. 10/744,283, on Apr. 14, 2009 (13 pages).
United States Patent and Trademark Office, "Non-Final Office Action," issued in connection with U.S. Appl. No. 10/744,283, on Oct. 30, 2008 (13 pages).
United States Patent and Trademark Office, "Final Office Action," issued in connection with U.S. Appl. No. 10/744,283, on Apr. 17, 2008 (11 pages).
United States Patent and Trademark Office, "Non-Final Office Action," issued in connection with U.S. Appl. No. 10/744,283, on Jul. 20, 2007 (12 pages).
United States Patent and Trademark Office, "Final Office Action," issued in connection with U.S. Appl. No. 10/744,555, on Jul. 17, 2009 (27 pages).
United States Patent and Trademark Office, "Non-Final Office Action," issued in connection with U.S. Appl. No. 10/744,555, on Jan. 14, 2009 (37 pages).
United States Patent and Trademark Office, "Final Office Action," issued in connection with U.S. Appl. No. 10/744,555, on May 12, 2008 (34 pages).
United States Patent and Trademark Office, "Non-Final Office Action," issued in connection with U.S. Appl. No. 10/744,555, on Aug. 6, 2007 (18 pages).
United States Patent and Trademark Office, "Final Office Action," issued in connection with U.S. Appl. No. 10/744,921, on Apr. 6, 2009 (23 pages).
United States Patent and Trademark Office, "Non-Final Office Action," issued in connection with U.S. Appl. No. 10/744,921, on Oct. 31, 2008 (23 pages).
United States Patent and Trademark Office, "Final Office Action," issued in connection with U.S. Appl. No. 10/744,921, on May 1, 2008 (24 pages).
United States Patent and Trademark Office, "Non-Final Office Action," issued in connection with U.S. Appl. No. 10/744,921, on Aug. 8, 2007 (16 pages).
United States Patent and Trademark Office, "Non-Final Office Action," issued in connection with U.S. Appl. No. 10/744,921, on Jul. 9, 2009 (24 pages).
United States Patent and Trademark Office, "Final Office Action," issued in connection with U.S. Appl. No. 10/745,047, on Mar. 27, 2009 (18 pages).
United States Patent and Trademark Office, "Non-Final Office Action," issued in connection with U.S. Appl. No. 10/745,047, on Jun. 12, 2008 (18 pages).
United States Patent and Trademark Office, "Notice of Allowance," issued in connection with U.S. Appl. No. 10/745,047, on Jul. 23, 2009 (7 pages).
United States Patent and Trademark Office, "Notice of Allowance," issued in connection with U.S. Appl. No. 10/745,116, on Aug. 14, 2009 (7 pages).
United States Patent and Trademark Office, "Notice of Allowance," issued in connection with U.S. Appl. No. 10/745,116, on May 7, 2009 (17 pages).
United States Patent and Trademark Office, "Final Office Action," issued in connection with U.S. Appl. No. 10/745,116, on Apr. 28, 2008 (25 pages).
United States Patent and Trademark Office, "Notice of Allowance," issued in connection with U.S. Appl. No. 10/745,116, on Dec. 3, 2008 (8 pages).
United States Patent and Trademark Office, "Non-Final Office Action," issued in connection with U.S. Appl. No. 10/745,116, on Aug. 7, 2007 (20 pages).
United States Patent and Trademark Office, "Notice of Allowance," issued in connection with U.S. Appl. No. 10/745,117, on May 14, 2009 (30 pages).
United States Patent and Trademark Office, "Non-Final Office Action," issued in connection with U.S. Appl. No. 10/745,117, on Nov. 26, 2008 (21 pages).
United States Patent and Trademark Office, "Final Office Action," issued in connection with U.S. Appl. No. 10/745,117, on May 12, 2008 (15 pages).
United States Patent and Trademark Office, "Non-Final Office Action," issued in connection with U.S. Appl. No. 10/745,117, on Apr. 17, 2008 (15 pages).
United States Patent and Trademark Office, "Non-Final Office Action," issued in connection with U.S. Appl. No. 10/745,117, on Aug. 8, 2007 (14 pages).

United States Patent and Trademark Office, "Supplemental Notice of Allowance," issued in connection with U.S. Appl. No. 10/745,117, on Jun. 15, 2009 (4 pages).

United States Patent and Trademark Office, "Notice of Allowance," issued in connection with U.S. Appl. No. 10/745,117, on Aug. 27, 2009 (7 pages).

United States Patent and Trademark Office, "Non-Final Office Action," issued in connection with U.S. Appl. No. 10/745,168, on Dec. 2, 2008 (25 pages).

United States Patent and Trademark Office, "Final Office Action," issued in connection with U.S. Appl. No. 10/745,168, on May 2, 2008 (21 pages).

United States Patent and Trademark Office, "Final Office Action," issued in connection with U.S. Appl. No. 10/745,168, on Aug. 8, 2007 (17 pages).

United States Patent and Trademark Office, "Notice of Allowance," issued in connection with U.S. Appl. No. 10/745,168, on Jun. 12, 2009 (22 pages).

United States Patent and Trademark Office, "Notice of Allowance," issued in connection with U.S. Appl. No. 10/745,168, on Aug. 7, 2009 (7 pages).

United States Patent and Trademark Office, "Final Office Action," issued in connection with U.S. Appl. No. 10/745,170, on Apr. 28, 2009 (21 pages).

United States Patent and Trademark Office, "Non-Final Office Action," issued in connection with U.S. Appl. No. 10/745,170, on Nov. 14, 2008 (21 pages).

United States Patent and Trademark Office, "Advisory Action," issued in connection with U.S. Appl. No. 10/745,170, on Oct. 21, 2008 (3 pages).

United States Patent and Trademark Office, "Final Office Action," issued in connection with U.S. Appl. No. 10/745,170, on Apr. 17, 2008 (14 pages).

United States Patent and Trademark Office, "Non-Final Office Action," issued in connection with U.S. Appl. No. 10/745,170, on Jul. 20, 2007 (14 pages).

United States Patent and Trademark Office, "Non-Final Office Action," issued in connection with U.S. Appl. No. 10/745,170, on Oct. 14, 2009 (23 pages).

United States Patent and Trademark Office, "Final Office Action," issued in connection with U.S. Appl. No. 10/829,495, on Mar. 23, 2009 (26 pages).

United States Patent and Trademark Office, "Non-Final Office Action," issued in connection with U.S. Appl. No. 10/829,495, on Oct. 29, 2008 (25 pages).

United States Patent and Trademark Office, "Final Office Action," issued in connection with U.S. Appl. No. 10/829,495, on Jun. 11, 2008 (22 pages).

United States Patent and Trademark Office, "Non-Final Office Action," issued in connection with U.S. Appl. No. 10/829,495, on Sep. 7, 2007 (24 pages).

United States Patent and Trademark Office, "Advisory Action," issued in connection with U.S. Appl. No. 10/829,495, on Jun. 4, 2009 (3 pages).

United States Patent and Trademark Office, "Non-Final Office Action," issued in connection with U.S. Appl. No. 10/829,495, on Oct. 1, 2009 (28 pages).

United States Patent and Trademark Office, "Interview Summary," issued in connection with U.S. Appl. No. 10/829,509, on Sep. 20, 2006 (4 pages).

United States Patent and Trademark Office, "Notice of Allowance," issued in connection with U.S. Appl. No. 10/829,509, on Jul. 10, 2007 (7 pages).

United States Patent and Trademark Office, "Notice of Allowance," issued in connection with U.S. Appl. No. 10/829,509, on Feb. 1, 2007 (8 pages).

United States Patent and Trademark Office, "Final Office Action," issued in connection with U.S. Appl. No. 10/829,509, on Nov. 13, 2006 (12 pages).

United States Patent and Trademark Office, "Non-Final Office Action," issued in connection with U.S. Appl. No. 10/829,509, on May 15, 2006 (11 pages).

United States Patent and Trademark Office, "Final Office Action," issued in connection with U.S. Appl. No. 10/829,539, on Mar. 13, 2009 (29 pages).

United States Patent and Trademark Office, "Non-Final Office Action," issued in connection with U.S. Appl. No. 10/829,539, on Nov. 25, 2008 (23 pages).

United States Patent and Trademark Office, "Final Office Action," issued in connection with U.S. Appl. No. 10/829,539, on Aug. 20, 2008 (29 pages).

United States Patent and Trademark Office, "Interview Summary," issued in connection with U.S. Appl. No. 10/829,539, on Apr. 28, 2008 (2 pages).

United States Patent and Trademark Office, "Non-Final Office Action," issued in connection with U.S. Appl. No. 10/829,539, on Oct. 27, 2007 (19 pages).

United States Patent and Trademark Office, "Advisory Action," issued in connection with U.S. Appl. No. 10/829,539, on Jun. 12, 2009 (3 pages).

United States Patent and Trademark Office, "Non-Final Office Action," issued in connection with U.S. Appl. No. 10/829,539, on Aug. 25, 2009 (41 pages).

United States Patent and Trademark Office, "Office Communication—No Action Count," issued in connection with U.S. Appl. No. 10/829,584, on Oct. 16, 2008 (4 pages).

United States Patent and Trademark Office, "Notice of Allowance," issued in connection with U.S. Appl. No. 10/829,584, on Sep. 22, 2008 (7 pages).

United States Patent and Trademark Office, "Final Office Action," issued in connection with U.S. Appl. No. 10/829,584, on Jun. 25, 2008 (20 pages).

United States Patent and Trademark Office, "Non-Final Office Action," issued in connection with U.S. Appl. No. 10/829,594, on Sep. 19, 2007 (15 pages).

United States Patent and Trademark Office, "Supplemental Notice of Allowance," issued in connection with U.S. Appl. No. 10/829,795, on Nov. 13, 2008 (2 pages).

United States Patent and Trademark Office, "Notice of Allowance," issued in connection with U.S. Appl. No. 10/829,795, on Sep. 9, 2008 (7 pages).

United States Patent and Trademark Office, "Final Office Action," issued in connection with U.S. Appl. No. 10/829,795, on Apr. 30, 2008 (20 pages).

United States Patent and Trademark Office, "Non-Final Office Action," issued in connection with U.S. Appl. No. 10/829,795, on Sep. 10, 2007 (21 pages).

United States Patent and Trademark Office, "Interview Summary," issued in connection with U.S. Appl. No. 10/829,795, on Aug. 1, 2008 (2 pages).

Don Ryan, The Telco Handbook for New Technicians—An Introduction to Telco Technology and Troubleshooting, Oct. 27, 2000, [retrieved from http://www.darkwing.net/aaron/telco.doc, accessed on Nov. 11, 2006], 67 pages.

Chen, Thomas M. and Liu, Steve S., Management and Control Functions in ATM Switching Systems, IEEE Network, Jul./Aug. 1994 (7 pages).

Meserole, Thomas A. and Prasad, Anil Customer Network Management (CNM) for ATM Public Network Service (M3 Specification), af-nm-0019.000, Rev. 1.04, Oct. 1994 (13 pages).

Mangan, Tim, OA&M: How a Frame Relay SLA is Measured and Diagnosed, http://www.mfaforum.org/frame/Whitepaper/whitepapers/OAMwhitepaper.shtml (11 pages).

United States Patent and Trademark Office, "Non-Final Office Action," issued in connection with U.S. Appl. No. 10/744,555, on Feb. 1, 2010 (26 pages).

United States Patent and Trademark Office, "Final Office Action," issued in connection with U.S. Appl. No. 10/744,921, on Mar. 3, 2010 (23 pages).

United States Patent and Trademark Office, "Non-Final Office Action," issued in connection with U.S. Appl. No. 10/745,170, on Mar. 30, 2010 (24 pages).

United States Patent and Trademark Office, "Non-Final Office Action," issued in connection with U.S. Appl. No. 12/254,233, on Apr. 15, 2010 (24 pages).

United States Patent and Trademark Office, "Non-Final Office Action," issued in connection with U.S. Appl. No. 12/334,248, on Apr. 13, 2010 (23 pages).

United States Patent and Trademark Office, "Notice of Allowance," issued in connection with U.S. Appl. No. 10/829,495, on Apr. 29, 2010 (7 pages).

United States Patent and Trademark Office, "Non-Final Office Action," issued in connection with U.S. Appl. No. 10/829,539, on Apr. 27, 2010 (32 pages).

United States Patent and Trademark Office, "Final Office Action," issued in connection with U.S. Appl. No. 10/744,555, on Oct. 7, 2010 (26 pages).

United States Patent and Trademark Office, "Final Office Action," issued in connection with U.S. Appl. No. 10/745,170, on Oct. 26, 2010 (24 pages).

United States Patent and Trademark Office, "Final Office Action," issued in connection with U.S. Appl. No. 10/829,539, on Sep. 23, 2010 (32 pages).

United States Patent and Trademark Office, "Final Office Action," issued in connection with U.S. Appl. No. 12/334,248, on Sep. 29, 2010 (25 pages).

United States Patent and Trademark Office, "Final Office Action," issued in connection with U.S. Appl. No. 12/254,233, on Sep. 29, 2010 (26 pages).

United States Patent and Trademark Office, "Non-Final Office Action," issued in connection with U.S. Appl. No. 12/551,477, on Nov. 16, 2010 (15 pages).

United States Patent and Trademark Office, "Non-Final Office Action," issued in connection with U.S. Appl. No. 12/570,938, on Oct. 7, 2010 (19 pages).

United States Patent and Trademark Office, "Non-Final Office Action," issued in connection with U.S. Appl. No. 12/609,683, on Oct. 25, 2010 (15 pages).

United States Patent and Trademark Office, "Notice of Panel Decision from Pre-Appeal Review," issued in connection with U.S. Appl. No. 10/744,921, on Sep. 7, 2010 (2 pages).

United States Patent and Trademark Office, "Non-Final Office Action," issued in connection with U.S. Appl. No. 12/609,940, on Dec. 9, 2010 (11 pages).

United States Patent and Trademark Office, "Non-Final Office Action," issued in connection with U.S. Appl. No. 12/609,415, on Dec. 9, 2010 (12 pages).

* cited by examiner

METHOD AND SYSTEM FOR PROVISIONING AND MAINTAINING A CIRCUIT IN A DATA NETWORK

CROSS-REFERENCE TO RELATED APPLICATIONS

This application is a continuation of U.S. patent application Ser. No. 10/348,592, filed Jan. 21, 2003, the disclosure of which is hereby incorporated by reference.

TECHNICAL FIELD

The present invention relates to provisioning and maintaining a circuit in a data network without manual intervention.

BACKGROUND

Data networks contain various network devices, such as switches, for sending and receiving data between two locations. For example, a frame relay network contains interconnected network devices that allow data packets to be channeled over a circuit through the network from a host to a remote device. For a given network circuit, the data from a host location is delivered to the network through a physical circuit such as a T1 line that links to a switch of the network. The remote device that communicates with the host through the network also has a physical circuit to a switch of the network. The communication path between the switches associated with the host and the remote device that passes through the network is a logical circuit. In a frame relay network, end devices do not select different routes for data packets sent between the host and the remote location, but always send the data packets through the same path. A host may have many logical circuits, such as permanent virtual circuits (PVCs) or switched virtual circuits (SVCs), linked to many remote locations. For example, a PVC in a frame relay network sends and receives data packets through the same path leading to the switch of the remote device's physical connection The switches in data network are generally in communication with one or more legacy logical and physical element modules. For example, in a frame relay network, a logical element module communicates with a switch to instruct the switch to function as a logical port in the network. The switches of the network send data packets to particular destinations and thereby create logical circuits in response to the information provided by the logical element module. Because the legacy logical element module has access to the switches, it can also log the operating parameters of each switch. The legacy logical and physical element modules are utilized by technicians to employ methods for provisioning and maintaining network circuits in the network. These current methods, however, suffer from several drawbacks.

First, to provision a network circuit for a service, it is currently necessary for a technician to establish the physical circuit by making a physical connection (i.e., wiring the circuit) between a host device and the switch and then to access a terminal in the logical element module to manually enter data for establishing the logical circuit in the switch. However, these current methods for provisioning network circuits require the utilization of manpower resources (i.e., technicians are required at the switch and at the legacy logical element module) which could be deployed elsewhere as well as the time required for the technicians to manually enter the provisioning data.

Second, to maintain a network circuit, currently two processes generally occur after a problem is reported. First, a technician accesses the legacy logical element module to troubleshoot the logical circuit by accessing and analyzing logical circuit data from one or more switches to determine if the logical circuit is down. If the logical circuit is operating properly, the technician then accesses the legacy physical element module to troubleshoot the physical circuit, which in most instances requires taking the network circuit out of service to perform testing. However, currently there is no access by the legacy physical element module to the logical data provided by the legacy logical element module for use in troubleshooting physical circuits. As a result of not having access to the logical data, there may be instances where the network circuit is unnecessarily taken out of service Therefore, there is a need for an interface to provision network circuits in a data network without manual intervention. There is a further need for access to logical circuit data to improve the maintenance of network circuits in a data network.

SUMMARY OF THE INVENTION

Embodiments of the present invention provide for a method and system for provisioning a network circuit in a data network without manual intervention. A network management module receives an order for provisioning the circuit and then, based on the order, transmits a request to a legacy logical element module to configure a logical circuit in one or more network devices in the network. The network device may be a switch. The circuit may be a frame relay circuit, an ATM circuit, or other logical circuit.

In another embodiment of the invention, a method and system are provided for maintaining a network circuit in a data network. The network circuit includes both a logical circuit and a physical circuit. A legacy physical element module sends a request for logical circuit data to a legacy logical element module through a network management module in communication with the legacy physical element module. Based on the request, the legacy logical element module retrieves the logical circuit data from one or more network devices in the network and transmits the data to the legacy physical element module through the network management module. Upon receiving the logical circuit data, the legacy physical element module troubleshoots the physical circuit to maintain the network circuit.

The various aspects of the present invention may be more clearly understood and appreciated from a review of the following detailed description of the disclosed embodiments and by reference to the drawings and claims.

DETAILED DESCRIPTION

Figure 1:
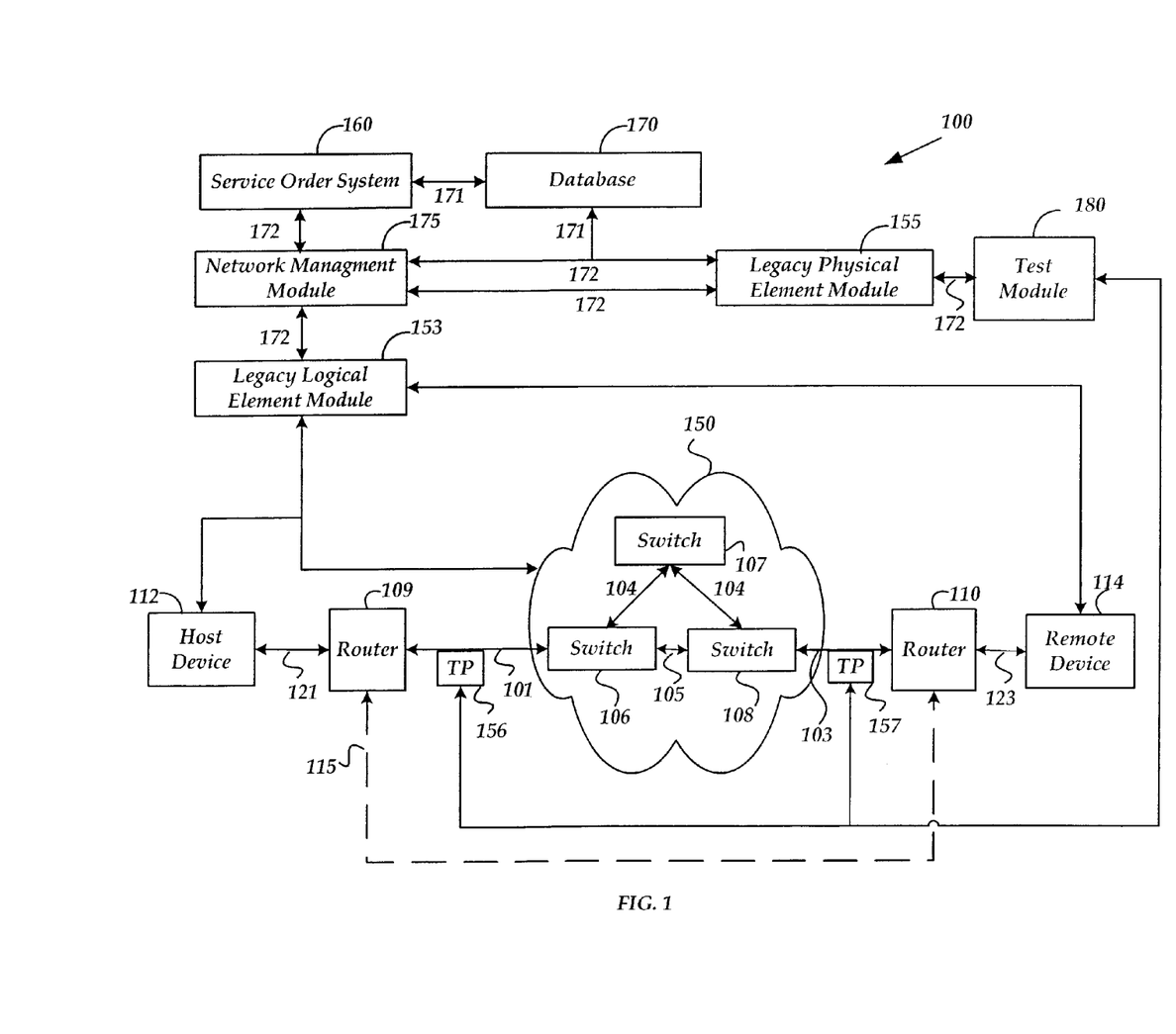
FIG. 1 shows a networked environment including a data network and a management system in accordance with an illustrative embodiment of the present invention.

Embodiments of the present invention are generally employed in a networked environment 100 as shown in FIG.

1. The networked environment 100, includes a data network 150, which contains one or more interconnected network elements, such as switches 106, 107, and 108, for transmitting data. The data network 150 may be a frame relay network. In one embodiment, the switches 106, 107, and 108 may be data packet switches. It will be appreciated that the data network may also contain other interconnected network devices and elements (not shown) such as digital access and cross connect switches (DACS), channel service units (CSUs), and data service units (DSUs).

The data network 150 channels data using a network circuit 115 between a host device 112 and a remote device 114. The network circuit 115 includes a physical circuit and a logical circuit. As used in the foregoing description and the appended claims, a physical circuit is defined as the physical path that connects the end point of a network circuit to a network device. For example, in the networked environment 100 of FIG. 1, the physical circuit of the network circuit 115 includes the physical connection 121 between the router 109 and the switch 106 as well as the physical connection 103 between the router 110 and the remote device 114. Routers 109 and 110 carry the physical signal from the end devices 112 and 114 over the connections 101 and 103 to the network 150. The routers 109 and 110 are connected to host devices 112 and 114 by links 121 and 123 respectively. The routers 109 and 110 may be local area network (LAN) routers, LAN bridges, hosts, front end processors, Frame Relay Access Devices (FRADs), or any other device with a frame relay or network interface. It should be appreciated that the host devices may be configured to serve as routers (thus eliminating the need for the routers 109 and 110). It should also be appreciated that a single router may be linked to multiple host devices. The physical connections 101 and 103 for the physical circuit may be any physical communications medium such as a 56 Kbps line or T1 line carried over a four-wire shielded cable or over a fiber optic cable.

As used in the foregoing description and the appended claims, a logical circuit is defined as a portion of the network circuit wherein data is sent over a communication data path between the first and last network devices in the data network. For example, in the networked environment 100 of FIG. 1, the logical circuit of the network circuit 115 may include the communication path 105 between the switches 106, 107, and 108 in the data network 150. In one embodiment, the logical path 105 may be a trunk for physically interconnecting the switches 106, 107, and 108. It should be understood that the actual path taken by data through the data network 150 is not fixed and may vary from time to time, such as when automatic rerouting takes place. For example, the logical circuit of the network circuit 115 may include the communication path 104 between the switches 106 and 108. It should be understood that no matter what path the data takes the beginning and end of the logical circuit (i.e., the switches 106 and 108) will not change. It will be appreciated that the data network 150 may contain additional switches or other interconnected network elements creating multiple paths between the switches 106, 107, and 108 defining the logical circuit in the data network. In the data network 150, the logical circuit may be either a permanent virtual circuit (PVC) remaining available to the network at all times or a temporary or switched virtual circuit (SVC) available to the network only as long as data is being transmitted.

In the networked environment 100, the network circuit 115 is established between the router 109 and the router 110 by channeling data packets or frames through the data network 150. In frame relay networks, each data frame sent from the host device 112 and the remote device 114 includes a header containing information, called a data link connection identifier (DLCI) which specifies the frame's destination, along with data. The header also includes specific bits for indicating the existence of congestion in the network and for discarding frames. In one embodiment, the logical circuit in the networked environment 100 may be provisioned with parameters for handling network congestion. These parameters may include a Committed Information Rate (CIR) and a Committed Burst Size (Bc). As is known to those skilled in the art, the CIR represents the average capacity of the logical circuit and the Bc represents the maximum amount of data that may be transmitted. The logical circuit may be provisioned such that when the CIR or the Bc is exceeded, the frame will be discarded by the receiving switch in the data network. It will be appreciated that the parameters for the logical circuit are not limited to the CIR and the Bc and that other parameters may be provisioned which are known to those skilled in the art. It should be understood that the embodiments of the present invention are not limited to frame relay networks but may also be implemented in other types of data networks such as asynchronous transfer mode (ATM) and native-mode local area networks.

The networked environment 100 may also include a signaling mechanism for determining the status of the logical circuit in the data network 150. In a frame relay network, the signaling mechanism may be in accord with a Local Management Interface (LMI) specification which provides for the sending and receiving of "status inquiries" between the network and an access device. The LMI specification includes obtaining status information through the use of special management frames with a unique DLCI address which may be passed between the network and the access device. These frames monitor the status of the connection and provide information regarding the health of the network. For example in the data network 150, the router 109 receives status information from the switch 106 in response to a status request sent in a special management frame. The LMI status information may include whether or not the logical circuit is congested or whether or not the network circuit is down. It should be understood that the parameters and the signaling mechanism discussed above are optional and that other parameters and mechanisms may also be utilized to obtain connection status information for a network circuit.

The networked environment 100 includes a service order system 160 for receiving service orders for provisioning network circuits. The service order includes information defining the transmission characteristics (i.e., the logical circuit) of the network circuit. The service order also contains the access speed, CIR, burst rates, and excess burst rates. The service order system 160 communicates the service order information to a network database 170 over management trunk 171. The network database 170 assigns and stores the parameters for the physical circuit for the network circuit such as a port number on the switch 106 for transmitting data over the physical connections 101 and 103 to the host device 112.

The network database 170 may also be in communication with an operations support system (not shown) for assigning physical equipment to the network circuit and for maintaining an inventory of the physical assignments for the network circuit. An illustrative operations support system is "TIRKS"® (Trunks Integrated Records Keeping System) marketed by TELECORDIA™ TECHNOLOGIES, Inc. of Morristown, N.J. The network database 170 may also be in communication with a Work Force Administration and Control system (WFA/C) (not shown) which is used to assign resources (i.e., technicians) to work on installing the physical circuit.

The networked environment 100 also includes a legacy logical element module 153 in communication with the switches 106, 108 and host device 112 and remote devices 114 through management trunks 185. The legacy logical element module 153 runs a network management application program to monitor the operation and retrieve data regarding the operation of the logical circuit established between switch 106 and switch 108 for the network circuit 115. The legacy logical element module may consist of terminals (not shown) that display a map-based graphical user interface (GUI) of the logical connections in the data network. An illustrative legacy logical element module is the NAVISCORE™ system marketed by LUCENT TECHNOLOGIES, Inc. of Murray Hill, N.J.

The networked environment 100 further includes a legacy physical element module 155. The legacy physical element module 155 runs a network management application program to monitor the operation and retrieve data regarding the operation of the physical circuit of the network circuit 115. The legacy physical element module is also in communication with the network database 170 for accessing information regarding physical circuits such as the line speed of the physical circuit. Similar to the legacy logical element module 153, the physical logical element module 155 may also consist of terminals (not shown) that display a map-based graphical user interface (GUI) of the physical connections in the data network. An illustrative physical element module is the Integrated Testing and Analysis System (INTAS), marketed by TELECORDIA™ TECHNOLOGIES, Inc. of Morristown, N.J., which provides flow-through testing and analysis of telephony services.

The legacy physical element module 155 troubleshoots the physical connections 101 and 103 for the physical circuit by communicating with test module 180 which interfaces with the physical connections via test access points 156 and 157. The test module 180 obtains the status of the physical circuit by transmitting "clean" test signals to test access points 156 and 157 which "loopback" the signals for detection by the test module 180. It should be understood that there may multiple test access points on each of the physical connections 101 and 103 for the physical circuit.

The networked environment further includes a network management module 175 in communication with the service order system 160, the network database 170, the legacy logical element module 153, and the legacy physical element module 155 through communications channels 172. The communications channels 172 may be on a local area network (LAN). The network management module 175 may include a terminal (not shown), which may be a general-purpose computer system with a display screen. The network management module 175 serves as an interface for implementing logical operations to provision and maintain network circuits in the networked environment 100. The logical operations may be implemented as machine instructions stored locally or as instructions retrieved from the legacy element modules 153 and 155. The network management module 175 may communicate with the legacy element management module 153 and the legacy physical element management module 155 using a Common Object Request Broker Architecture (CORBA). As is known to those skilled in the art, CORBA is an open, vendor-independent architecture and infrastructure which allows different computer applications to work together over one or more networks using a basic set of commands and responses. An illustrative routine illustrating the logical operations performed by the network management module 175 to provision and maintain network circuits is described below with reference to FIGS. 2-3.

Figure 2:
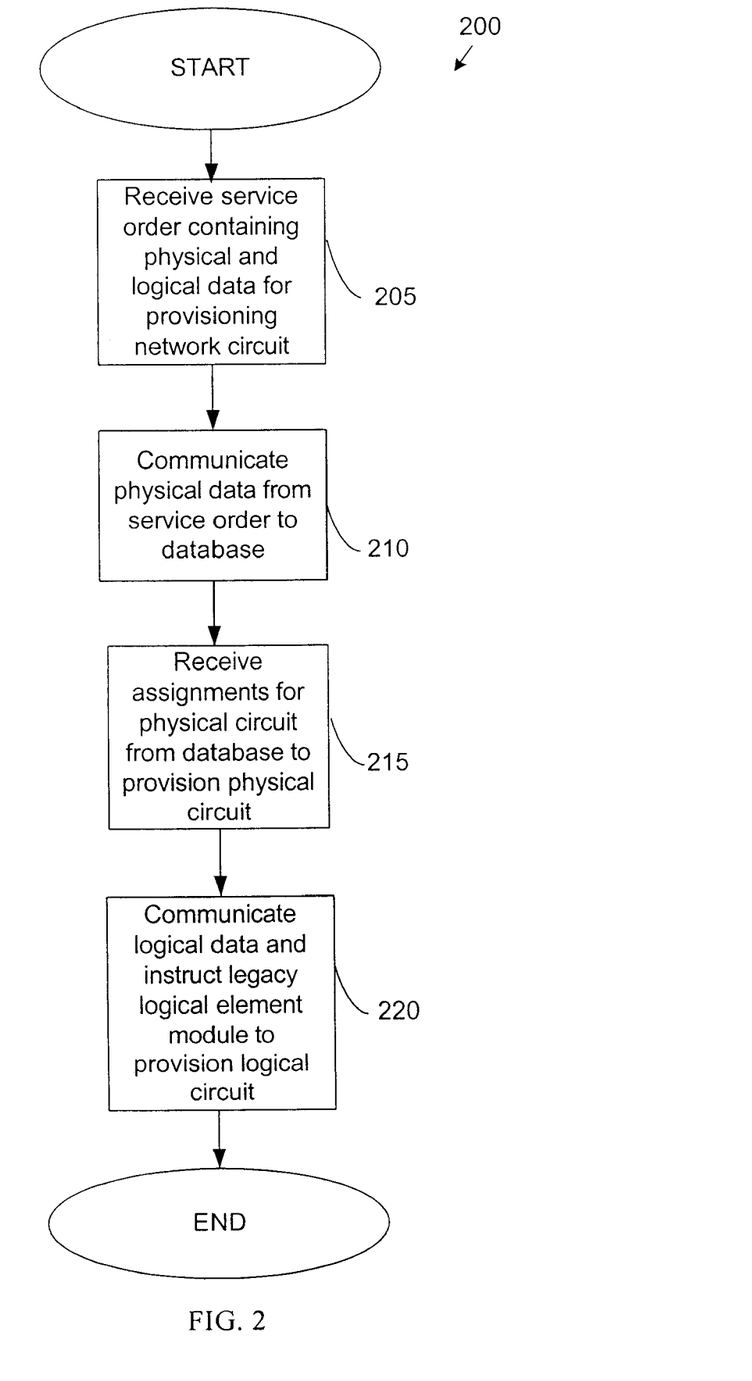
FIG. 2 shows an illustrative routine for provisioning a network circuit in the networked environment shown in FIG. 1.

FIG. 2 shows an illustrative routine for provisioning a network circuit in the networked environment 100. Referring now to FIG. 2, the routine 200 begins at block 205 wherein the network management module 175 receives a service order from the service order system 160 for provisioning a network circuit for a customer, such as network circuit 115. As described above, the service order includes information defining the transmission characteristics of the logical circuit (i.e., access speed, CIR, burst rates, excess burst rates, and DCLI), as well as the physical information needed by downstream systems (i.e., TIRKS and WFA) to assign physical equipment for installing the physical circuit. At block 210, the service order system 160 communicates the physical circuit information to the network database 170 which assigns the parameters for the physical circuit such as the port number on the switch 106 for transmitting data over the physical connections 101 and 103 to the host device 112.

The routine 200 continues to block 215 wherein the network management system 175 receives the assignments for the physical circuit from the network database 170. The network management module 175 then communicates the physical circuit information to a technician who makes the physical connections to establish the physical circuit (i.e., provisions) based on the assignments received from the network database 170.

At block 220, the network management module 175 communicates the logical information from the service order request to the legacy logical element module 153 with instructions to provision the logical circuit. The legacy logical element module 153 provisions the logical circuit by locating the appropriate network devices, and programming ports on the switches in the data network 150 to create the logical circuit. For example, in the networked environment 100, the legacy logical element module 153 would access ports in network device 106, 107, 108 and program the ports to deliver data from the host 112 to the remote device 114 over connection path 105. Thus, the logical circuit for the network circuit 115 is provisioned by the network management module 175 without manual intervention.

Figure 3:
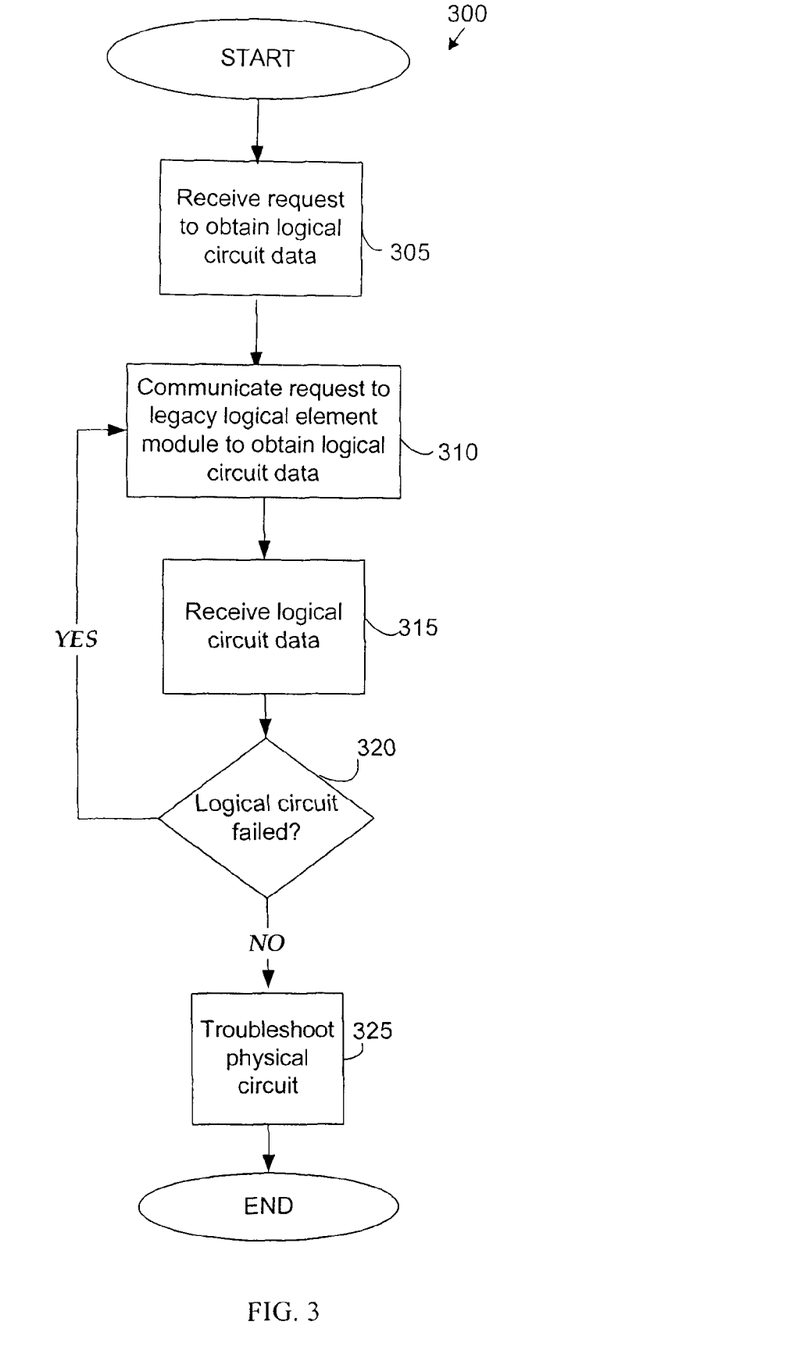
FIG. 3 shows an illustrative routine for performing maintenance on a network circuit in the networked environment shown in FIG. 1.

FIG. 3 shows an illustrative routine method 300 for performing maintenance on the network circuit 115 in the networked environment 100. The routine 300 begins at block 305 wherein, in response to a reported problem, the legacy physical element module 155 obtains the physical circuit information (e.g., port information) from the network database 170 and sends a request to network management module 175 to obtain the logical circuit information for the network circuit 115.

The routine 300 continues to block 310, upon receiving the request from the legacy physical management module 155, the network management module 175 sends a request to the legacy logical element module 153 to obtain logical circuit data, such as the LMI status, for the logical circuit. At block 315, the legacy logical element module 153 retrieves the logical circuit data from a switch, such as switch 106, in the data network 150. The retrieved data may include the aforementioned LMI information as well as the CIR, the Bc, and the DLCI for the logical circuit. The legacy logical element module 153 then communicates the logical circuit data to the network management module 175.

At block 320, the network management module 175 examines the logical circuit data to determine whether or not the logical circuit has failed (i.e., the logical circuit is not transmitting data) so that the legacy physical element module 155 can safely test the network circuit 115 by taking it out of service without losing data. For example, if the LMI information indicates that the logical circuit is congested (i.e., the current access speed exceeds the CIR or the Bc thereby causing frames to be dropped in the data network 150) or if the LMI information indicates that the network circuit 115 is "down" (indicated by the absence of a "keep alive" signal between a router and a switch in the data network), then the network management module 175 will communicate the logical circuit data to the legacy physical element module 155 and instruct the legacy physical element module 155 to test the physical circuit at block 325. The legacy physical element module 155 tests the physical circuit by communicating a request to the test module 180 to access a loop-able test point 156 or 157 on the physical connections 101 or 103. The tests may consist of determining whether the test module 180 can detect a clean signal that it transmits out to the loop-able test point. It will be appreciated that more detailed and advanced testing may also be performed by technicians using tools within the legacy physical element module 155 as well as other tools.

Conversely, if at block 320, the network management module 175 determines that the legacy physical element module 155 can not safely test the network circuit 155 (e.g., the logical circuit is not congested and the network circuit 115 is "up," then the network management module 175 communicates again with the legacy logical element module to determine if another logical circuit in the data network 150 has failed at block 310. As discussed briefly above, the communications between the legacy physical element module 155, the network management module 175, and the legacy logical element module 153 may be implemented using script files containing sets of commands and responses through a CORBA interface.

The network management module 175 enables the legacy physical element module 155 to obtain logical circuit data from the legacy logical element module 153. As a result, technicians at the legacy physical element module 155 are able to use the logical circuit data to troubleshoot network circuits without unnecessarily taking them out of service. Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A non-transitory computer-readable storage medium, comprising computer instructions that, when executed, cause a machine to at least:
   receive a request to provision a network circuit, wherein the network circuit comprising a logical circuit and a physical circuit, wherein the request includes including information defining transmission characteristics of the logical circuit and the physical circuit for assigning physical equipment needed for installing the physical circuit;
   transmit the request and instructions to provision the logical circuit to a legacy logical element module without manual intervention, the instructions to be utilized by the legacy logical element module to configure the logical circuit, configuring the logical circuit comprising accessing and programming at least one network device port to send data describing a logical data path to at least one network device in communication with the legacy logical element module; and
   obtain logical circuit data for maintaining to maintain the network circuit by:
      sending a request to the logical element module to obtain the logical circuit data which retrieves the logical circuit data from the at least one network device having access to the network circuit, and
      receiving the logical circuit data from the logical element module.

2. The storage medium of claim 1, wherein the instructions are to configure the logical circuit by sending the data describing a logical data path to at least one network device in communication with the legacy logical element module to provision the network circuit.

3. The storage medium of claim 1, wherein the network circuit is provisioned for frame relay service.

4. The storage medium of claim 1, wherein the network circuit is provisioned for asynchronous transfer mode (ATM) service.

5. The storage medium of claim 1, wherein the information defining the transmission characteristics of the logical circuit includes at least one of an access speed, a committed information rate (CIR), a burst rate, an excess burst rate, or a data link connection identifier.

6. A system, comprising:
   a network management module comprising a processor programmed to send a request to provision a network circuit, the request to provision the network circuit including information defining transmission characteristics of a logical circuit and a physical circuit;
   a legacy logical element module to receive a request from the network management module, the legacy logical element module to configure a logical circuit based on the request without manual intervention by accessing and programming at least one network device port to send data describing a logical data path to at least one network device in communication with the legacy logical element module; and
   a legacy physical element module to obtain logical circuit data of the network circuit from a network management module.

7. The system of claim 6, wherein obtaining logical circuit data for the network circuit from a network management module comprises:
   the legacy physical element module to send a request to the network management module to obtain the logical circuit data;
   the network management module to request logical circuit data from the legacy logical element module;
   the legacy logical element module to retrieve the logical circuit data from the at least one network device having access to the network circuit;
   the legacy logical element module to send the logical circuit data to the network management module; and
   the legacy physical element module to receive the logical circuit data from the network management module.

8. The system of claim 6, wherein the network device is at least one of a switch or a router.

9. The system of claim 6, wherein the network circuit is a frame relay circuit.

10. The system of claim 6, wherein the network circuit is an ATM circuit.

11. A method, comprising:
   sending a request to a network management module to obtain logical circuit data associated with a network circuit comprising a physical circuit and a logical circuit;

at the network management module, requesting the logical circuit data from a legacy logical element module;

receiving the request at the legacy logical element module;

at the legacy logical element module, retrieving the logical circuit data from at least one network device having access to the network circuit, and sending the logical circuit data to the network management module;

receiving the logical circuit data from the network management module;

based on the logical circuit data, determining whether data is being transmitted over the network circuit;

if the network circuit is transmitting data, troubleshooting the logical circuit; and if the network circuit is not transmitting data, troubleshooting the physical circuit.

12. The method of claim 11, wherein the physical circuit comprises a physical path for the network circuit in the data network.

13. The method of claim 11, wherein the logical circuit comprises data describing a logical data path for the network circuit in the data network, the logical circuit including variable communication paths in the data network.

14. The method of claim 11, wherein the logical circuit data contains local management interface information.

15. The method of claim 14, wherein the local management interface information is used to determine data traffic congestion for the logical circuit.

16. A system, comprising:

a legacy physical element module comprising a processor programmed to obtain logical circuit data associated with a network circuit from a network management module, obtaining logical circuit data for the network circuit from the network management module comprising:

sending a request to the network management module to obtain the logical circuit data;

at the network management module, requesting the logical circuit data from a legacy logical element module;

receiving the request at the legacy logical element module;

at the legacy logical element module, retrieving the logical circuit data from at least one network device having access to the network circuit, and sending the logical circuit data to the network management module; and receiving the logical circuit data from the network management module; and the legacy physical element module adapted to:

place the network circuit out of service responsive to detecting from the logical circuit data that the logical circuit has failed; and troubleshoot the physical circuit based on the logical circuit data.

17. The system of claim 16, further comprising a test module in communication with the legacy physical element module to access a test point in the at least one network device to troubleshoot the physical circuit.

18. The system of claim 16, wherein the network device is a switch.

19. The system of claim 16, wherein the network circuit is a frame relay circuit.

20. The system of claim 16, wherein the network circuit is an ATM circuit.

21. A method, comprising:

receiving a request to provision a network circuit, the network circuit comprising a logical circuit and a physical circuit, and the request including information defining transmission characteristics of the logical circuit and the physical circuit needed for installing the physical circuit;

responsive to the request, provisioning the logical circuit without manual intervention, configuring the logical circuit comprising accessing and programming at least one network device port to send data describing a logical data path to at least one network device having access to the network circuit; and maintaining the network circuit after it is provisioned by retrieving logical circuit data from the at least one network device having access to the network circuit.

22. The method of claim 21, comprising communicating the information associated with the physical circuit to a technician to make physical connections to establish the physical circuit.

23. The method of claim 21, further comprising:

placing the network circuit out of service responsive to detecting from the logical circuit data that the logical circuit has failed; and troubleshooting the physical circuit based on the logical circuit data.

24. The method of claim 21, wherein the network device corresponds to at least one of a switch or a router.

25. The method of claim 21, wherein the network circuit corresponds to at least one of a frame relay circuit or an asynchronous transfer mode (ATM) circuit.

* * * * *

UNITED STATES PATENT AND TRADEMARK OFFICE
CERTIFICATE OF CORRECTION

PATENT NO. : 7,890,618 B2  
APPLICATION NO. : 12/339426  
DATED : February 15, 2011  
INVENTOR(S) : Taylor et al.

Page 1 of 1

It is certified that error appears in the above-identified patent and that said Letters Patent is hereby corrected as shown below:

Column 7, line 50 (claim 1), after "circuit," delete "wherein"  
Column 7, line 52 (claim 1), after "circuit," delete "wherein", after "request" delete "includes"  
Column 7, line 66 (claim 1), after "data" delete "for maintaining"

Signed and Sealed this  
Eighth Day of November, 2011

David J. Kappos  
*Director of the United States Patent and Trademark Office*